United States Patent Office.

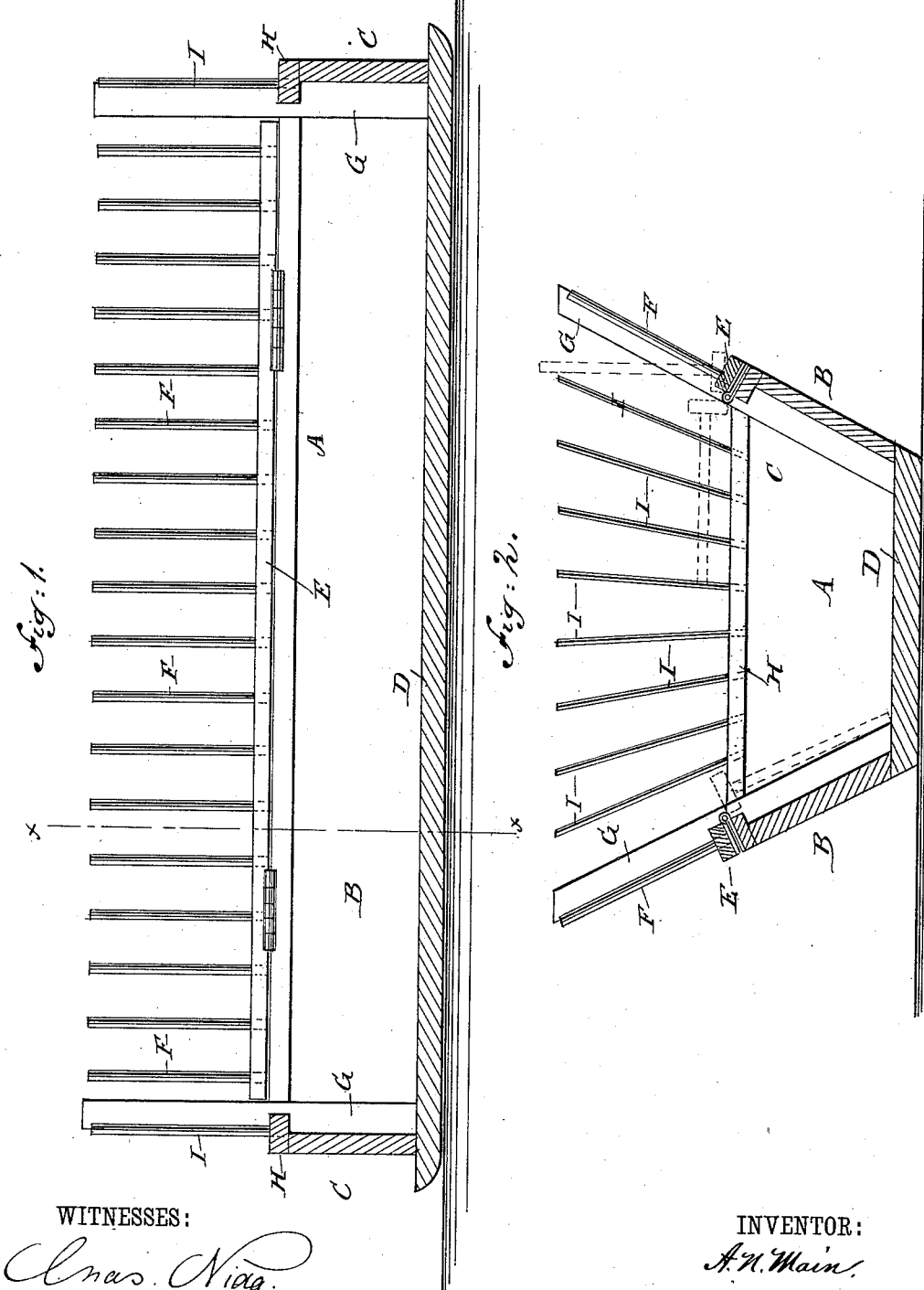

ALVIN N. MAIN, OF PITTSFIELD, ILLINOIS.

FEED-TROUGH.

SPECIFICATION forming part of Letters Patent No. 378,603, dated February 28, 1888.

Application filed August 3, 1887. Serial No. 246,044. (No model.)

*To all whom it may concern:*

Be it known that I, ALVIN N. MAIN, of Pittsfield, in the county of Pike and State of Illinois, have invented a new and Improved Feed-Trough, of which the following is a full, clear, and exact description.

The object of my invention is to provide a new and improved feed-trough for live stock by which the animals are prevented from spilling the feed and the seed contained in the feed is saved.

The invention consists of a trough provided with end pieces having upwardly-extending pins and inclined sides having hinged bars on either upper edge, the said hinged bars being provided with upwardly-projecting pins.

Reference is to be had to the accompanying drawings, forming a part of this specification, in which similar letters of reference indicate corresponding parts in both figures.

Figure 1 is a longitudinal sectional elevation of my improvement, and Fig. 2 is a vertical cross-section of the same on the line $x\,x$ of Fig. 1.

My improvement is provided with a feed-box, A, having the inclined sides B B, the straight ends C C, and the bottom D, which is rounded off at each end like sleigh-runners, so as to facilitate the moving of my improvement over the ground. On the upper edges of the inclined sides B are hinged the bars E, each provided with a series of pins, F, extending upward and placed suitable distances apart. The bars E are adapted to swing inward with their pins F.

From the corners of the box A the posts G extend upward in an inclined position to about the same height as the pins F. On the upper edges of the ends C are secured the transverse beams H, each of which is provided with a series of pins, I, of the same length and shape as the pins F, and placed suitable distances apart.

The operation is as follows: When the hinged bars E with the pins F are in the position shown in Figs. 1 and 2, then the feed—for instance, hay, clover, &c.—is placed in the feed-box A, extending to the upper ends of the pins F and I. The animals, in order to reach the feed, have to pull the latter out through the pins F, and as the feed diminishes the animals push the pins F inward with their heads, the pins with their bars E swinging on their respective hinges on the upper edges of the inclined sides B. The pins F, after a certain amount of feed is removed from the box A, assume a vertical position, and after a further decrease of feed in the box they assume an inclined and, finally, a horizontal position, as shown in dotted lines in Fig. 2, the animals accomplishing this movement of the pins F with their heads. The animals are prevented from spilling the feed, as they can only get at it through the pins F. The seed of the hay, clover, &c., cannot be pushed out of the trough by the animals, and it remains in the trough and can be used for various purposes.

Having thus fully described my invention, I claim as new and desire to secure by Letters Patent—

In a feed-trough, the combination, with a box provided with end pieces having upwardly-extending pins, and also provided with inclined sides, of bars hinged on the upper ends of the inclined sides, and pins extending from said bars which are adapted to swing inward, substantially as shown and described.

ALVIN N. MAIN.

Witnesses:
 V. A. GRIMES,
 W. B. GRIMES.